Sept. 18, 1923.　　　　　　　　　　　　　　　　1,468,332
F. N. SPRAGUE
COMBINED AIR AND LIQUID SHOCK ABSORBING MECHANISM FOR AUTOMOTIVE VEHICLES
Filed Feb. 1, 1922
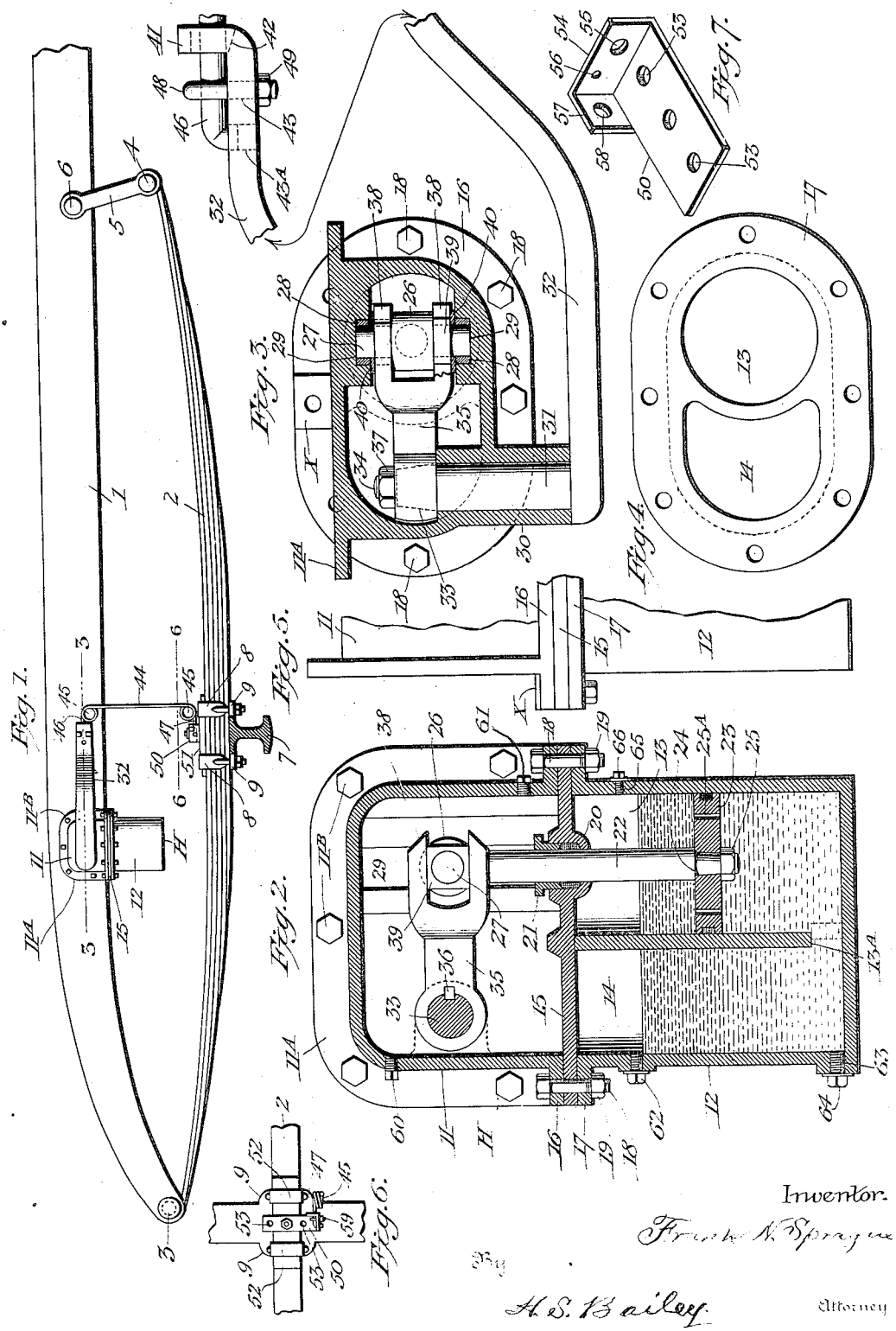
Inventor.
Frank N. Sprague
By
H. S. Bailey.　　Attorney Patented Sept. 18, 1923.

1,468,332

UNITED STATES PATENT OFFICE.

FRANK N. SPRAGUE, OF HOLYOKE, COLORADO.

COMBINED AIR AND LIQUID SHOCK-ABSORBING MECHANISM FOR AUTOMOTIVE VEHICLES.

Application filed February 1, 1922. Serial No. 533,496.

*To all whom it may concern:*

Be it known that I, FRANK N. SPRAGUE, a citizen of the United States of America, residing at Holyoke, county of Phillips, and State of Colorado, have invented a new and useful Combined Air and Liquid Shock-Absorbing Mechanism for Automotive Vehicles, of which the following is a specification.

This invention relates to improvements in combined air and liquid shock absorbing mechanism for automotive vehicles.

The object of the invention is to provide a mechanism adapted to be connected to the frame of the car and to the axle, and having a piston which is operated by the vertical movement of the car body, said piston being mounted in a partially filled oil cylinder having a communicating oil chamber, whereby, as the piston is moved through said body of oil, its passage is retarded and the oil acts to gradually compress a body of air above said oil, thereby gradually cushioning both the drop and rebound of the car body. Further to provide a housing which is secured to each side bar of an automobile, or other vehicle, having an oil cylinder and a communicating oil chamber, said cylinder having a perforated piston mounted therein, which permits the oil to pass slowly through the piston, and a lever mechanism connected therewith and with the adjacent axle, whereby, as the said piston is moved through the body of oil, its progress is retarded, and the oil acts to compress a body of air above the oil in the communicating chamber, on the downward movement of the piston, and to compress a body of air above the oil in the oil cylinder, on the upward movement of the piston, thereby gradually cushioning both the drop and the rebound of the car body, the compressing of the air acting as an auxiliary means in connection with the cushioning effect produced by the perforated piston in its passage through the oil.

Further, to provide a mechanism of this character in which the cushioning action of the piston is in proportion to the force of the shock offered by the car body, so that under average load and road conditions the cushioning action is gradual, while under a heavy jar or rebound the cushioning action is quick and in direct proportion to the force with which the piston is forced through the oil.

These objects are accomplished by the mechanism illustrated in the accompanying drawings, in which:

Figure 1 is a side view of the front portion of one of the side bars of an automobile frame, showing the housing having the cushioning mechanism which is bolted to said bar, and the operating lever for said mechanism, which is connected to the adjacent axle or to the spring in such manner as to be operated by the movement of the car body.

Fig. 2 is a vertical sectional view through the housing, on an enlarged scale.

Fig. 3 is a horizontal sectional view on the line 3—3 of Fig. 1.

Fig. 4 is a plan view of the lower half of the housing, showing the oil cylinder and the communicating oil chamber.

Fig. 5 is an end view of a portion of the housing.

Fig. 6 is a sectional view on the line 6—6 of Fig. 1; and

Fig. 7 is a perspective view of the clip to which the lower end of the lever mechanism-operating rod is connected.

Referring to the accompanying drawings:

The numeral 1, designates the front portion of one of the side bars of an automobile, and 2, the usual semi-elliptic leaf spring which is connected at its forward end to a bolt 3, which passes through the front end of the side bar, and at its rear to a bolt 4, which is supported in a common form of shackle 5, which is pivotally connected to the side bar by a bolt 6. The spring 2, is secured about midway of its length to the forward axle 7, by U-clips 8, the ends of which pass through holes in projections 9, formed on the said axle, and receive nuts 10, which are clamped against the underside of the projections 9, thereby securing the spring to the axle in the usual manner.

The housing H, which encloses the cushioning mechanism proper, comprises an upper member or hood 11, a lower member 12, formed with an oil cylinder 13, and a communicating oil chamber 14, and a plate or diaphragm 15, which is clamped between the upper and lower members, and which serves to close the lower end of the hood 11, and the upper end of the lower member 12.

The lower end of the hood and the upper end of the lower member 12, are formed with flanges 16 and 17, respectively, and bolts 18, are passed through holes in the said flanges and through the diaphragm 15, and receive nuts 19, by which the diaphragm is tightly clamped between the flanges 16 and 17 of the upper and lower members of the housing. The parts 11 and 12, which constitute the housing, are flat on their opposite sides and rounded at their ends, as shown in Figures 3 and 4, and the rear wall of the hood 11, is formed with a flange 11^A, which extends beyond the top and the opposite end portions of the hood, and this flange is provided with bolt holes through which bolts 11^B, are passed to secure the hood to the side bar 1, as shown in Fig. 1. The flange 16, of the hood, lies beneath the under side of the side bar 1, and this part of the flange is preferably formed with a central, raised portion X, which bears against the under side of the side bar, and prevents uneven contact between the said flange and the under side of the side bar, when the housing is secured at a point on the bar when the under side of the said bar is curved.

The diaphragm 15, is provided with a hole in line with the axial center of the oil cylinder 13, and this hole is surrounded by a packing box 20, having a packing gland 21, which is screwed into the upper end of the packing box. A piston rod passes through the gland and packing box and into the cylinder 13, and the lower end portion of this piston rod is reduced in diameter to receive a piston 23, which abuts against a shoulder 24, formed by reducing the said end portion of the rod, and a nut 25, is screwed upon the projecting threaded end of the reduced portion and against the piston, thereby rigidly securing the same upon the piston rod. The piston is normally positioned midway of the length of the cylinder, and the upper end of the piston rod terminates at a point substantially midway between the diaphragm 15, and the top of the hood. The piston is provided with a series of holes or ports 25^A, which extend entirely through the same, the purpose of which will be hereinafter set forth. The upper end of the piston rod terminates in a circular apertured head 26, which is flat on opposite sides, and a pin 27, is fitted in the head and extends a suitable distance beyond each side of the same, and upon the ends of the pin are pivotally mounted rectangular slide blocks 28, which fit snugly in vertical slideways 29, which are formed in the opposite walls of the hood 11. By this means the piston rod is limited to a direct vertical movement through the packing box and its gland, whereby wear on these parts is reduced to a minimum.

Upon the front wall of the hood and adjoining the end farthest from the slideways 29, is formed a bearing hub 30, which extends partly within and partly without the hood, and in this hub is mounted a pivot pin or trunnion 31, which is formed on the forward end of a rearwardly extending lever 32, which is spaced from the front wall of the hood far enough to have an up and down rocking movement without coming in contact with the flange 16 of the hood, as will be understood by reference to Fig. 3.

The pin or trunnion 31, extends a short distance beyond the inner end of the hub 30, and this extended portion is tapered for a part of its length, as shown at 33, and then terminates in a reduced threaded end 34. An arm 35, is provided at one end with a tapered aperture, in which the tapered portion 33, of the pin 31, is inserted and is held against turning thereon by a key 36. A nut 37, is screwed upon the threaded end 34, of the pin, and holds the arm 35, securely upon the tapered portion of the pin. The opposite end of the arm 35, is forked or bifurcated to form parallel members 38, which receive between them the circular head 26, on the upper end of the piston rod 22, and each member 38, is bifurcated to receive slide blocks 39, which are pivotally mounted on the pin 27, which is carried by the head 26. The blocks 39, are flush with the outer faces of the bifurcated members 38, and washers 40, are placed upon the pin 27, between the bifurcated members 38, and the side walls of the hood to close the space between these parts. The lever 32, is bent to extend inward towards the side bar 1, for a part of its length and then rearward for the remainder of its length, the rear end portion being parallel with the side bar and in line with the axial center of the cylinder 13. The rear end of the lever terminates in a short, right angled bend 41, which is provided with a slot 42, and adjacent this bent end 41, the lever is provided with holes 43, which are arranged one above the other, and with a hole 43^A, for a purpose to be presently shown. The rear end of the lever 32, is connected to the spring in such manner that the up and down movements of the vehicle body cause a rocking movement of the said lever, and the manner of connecting the spring and the end of the lever is as follows.

I employ a stiff and strong, but resilient, rod 44, the opposite end portions of which are bent to form one or more coils 45, which terminate in short, straight end portions 46 and 47, which lie at right angles to the rod. The part 46, of the rod 44, is passed through this hole 42, in the end of the lever 32, and the end of this part 46, which terminates in a short right angled bend, is inserted in the hole 43^A; a U-clip 48 is then placed over the part 46, and through the holes 43, in the lever, and nuts 49, are screwed upon their ends, thus rigidly clamping the part 46, to the end of the lever.

The lower end of the rod 44, is secured to a plate 50, which is bolted to the spring 2, the position of the plate 50, being determined by the position of the housing on the side bar. In Figures 1 and 6, this plate is shown bolted to the usual spacing block 51, which is clamped upon the spring by the U-bolts 8, which secure the spring 2, to the axle; but when it is necessary to secure the plate 50, either forward or rear of the axle, by reason of the position of the housing, it is then connected directly to the spring by a U-clip, which is passed through holes 53, in the plate, and secured by nuts in the usual manner.

One end of the plate 50, is upturned, as shown at 54, and is formed with holes 55 and 56, and a short upturned portion 57, is formed on one side edge of the plate, connecting with the upturned portion 54, and the latter upturned portion is provided with a hole 58. The lower member 47, of the rod 44, is passed through the hole 58, and the end of this member 47, which terminates in a short, right angled bend, is inserted in the hole 55, and the member 47, is then clamped to the upturned member 54, by an eye bolt 59, this securely attaching the lower end of the rod 44, to the plate 50. By the employment of the above described connection between the lever 32, and the spring, pivotal connections at the opposite ends of the rod 44, are made unnecessary, as the coils 45, at the opposite ends of the rod, provide a yielding connection between the upper end of the rod and the lever, and between the lower end of the rod and the plate 50, which permits the rod 44, to swing relatively to the arc described by the end of the lever 32, as the vehicle body moves up and down. By dispensing with pivotal connections at the opposite ends of the rod 44, wear at these points and the consequent necessity for repair and for lubrication is eliminated.

The hood is preferably filled with a heavy lubricating oil, and to accomplish this, a threaded hole is provided in the upper portion of the hood which is normally closed by a threaded plug 60, which may be removed when it is desired to supply lubricant to the hood. A screw plug 61 is also threaded to the hood in such position that when removed, a suitable tool may be inserted in the hood for regulating the gland 21 of the packing box 20.

A screw plug 62 normally closes a filling hole in the oil chamber 14 and this hole defines the oil level in the chamber 14 and in the cylinder 13, and an opening 13A, of suitable area, is formed in the lower end of the cylinder wall, which forms a communication between the chambers 13 and 14, thus permitting the passage of oil from one chamber to the other. A drain hole 63 is also formed at the bottom of the chamber 14, which is normally closed by a screw plug 64, and a vent hole 65 is formed in the cylinder 13 above the normal oil level therein, which is normally closed by a screw plug 66, and this plug is removed when filling to prevent air compression in the chamber, and also when drawing off the oil, to prevent the formation of a vacuum in the chamber.

In practice, the improved mechanism is secured to the side bar of the vehicle, and to the spring in the manner above described, four of these being employed, or one for each side spring, and each member 12 of each housing is filled with oil to the lever of the plug 62.

Under average road and load conditions, there is a constant up and down movement of the body of the vehicle, which is ordinarily neutralized, or partially neutralized, by the action of the springs, but even this motion may become disagreeable if the springs are not of the proper resiliency to absorb the shock. With the improved mechanism, however, the slightest up or down movement of the vehicle body is instantly communicated to the lever 32, and thence through the arm 35 and piston rod 22 to the piston 23, which is submerged in the oil, which partially fills the cylinder 13 and the communicating chamber 14, and the cushioning effect results as follows:

As the vehicle body moves down, the housing H is also carried down with it, but the rear end of the lever 32 remains on practically the same horizontal plane but turns slightly by reason of its connection with the coil 45. If the lever 32, for example, is about ten inches long, and the car body drops four inches, then the pin 31 at the front end of the said lever, on which the arm 35 is secured, also moves down four inches; but the pin 27 in the upper end of the piston rod 22, and which is operated by the arm 35, which is practically two inches long, is, for example, about eight inches from the rear end of the lever 32, and thus while the pin 31 travels in an arc whose radius is ten inches, the pin 27 travels in an arc whose radius is only about eight inches. Therefore, while the housing moves down four inches, the piston 23 moves down a less distance, and is therefore in reality moved up through the oil in the cylinder 13.

As the piston moves through the oil, the oil is forced through the ports or holes 25 in the piston, and its movement is thus retarded, but at the same time, a portion of the oil is lifted by the piston, thereby reducing the area of the air space above the piston and at the same time compressing the air in the said air space. Thus, the compression of the air above the piston acts as an auxiliary means, in cooperation with the retarding action of the oil through which the piston is drawn, to gradually and effectively cushion the downward movement of the vehicle body. On the rebound or upward movement of the body, the piston, which always moves in an arc of less radius than the pin 31 at the front end of the lever 32, travels a less distance upward than the housing, and therefore is forced downward through the oil in the cylinder, a portion of which passes through the piston ports 25, but the pressure of the piston on the oil forces oil below the piston through the opening 13^A connecting the cylinder and the chamber 14 and thus raises the level of the oil in the said cylinder 14, by which the air in the upper end of the said chamber is compressed, and acts in conjunction with the retarding effect of the oil upon the piston, to gradually cushion the rebound of the car body. Thus, on either the drop or rebound of the car body, the movement is instantly cushioned and then absorbed by the combined action of the oil through which the piston passes, and the air compressed by the oil either in the cylinder, or in the chamber 14, as the case may be; and it will be understood that the cushioning action is necessarily in proportion to the force of the shock either on the drop or on the rebound of the car body, as the greater the shock, the greater the combined resistance offered by the oil and compressed air to the movement of the piston, and vice versa.

As the hood is filled with heavy oil, the slideways 29 and the bifurcated end of the piston-operating arm 35 are kept thoroughly lubricated, and the slideways hold the piston rod true to the axis of the cylinder, thus minimizing wear at all points.

Having described my invention, what I claim as new and desire to secure by Letters Patent, is:

1. In a shock absorber of the character described, the combination with an automobile side bar, an axle, and a spring connected to said side bar, and to said axle, of a housing connected to said side bar, comprising a hood, a lower member and a separating diaphragm, said lower member comprising a cylinder and a communicating chamber which are partially filled with oil, leaving an air space above said oil, a ported piston in said cylinder having a rod extending through said diaphragm, an arm connected at one end to said piston rod, a lever pivotally mounted in said hood and rigidly connected at one end to the other end of said arm, and a rod connecting the other end of said lever and said spring.

2. In a shock absorber of the character described, the combination with an axle, a side bar and a spring connected to said side bar and to said axle; of a housing secured to said side bar comprising a hood, a lower member and a separating diaphragm, said lower member comprising a cylinder and a communicating chamber which are partially filled with oil, leaving an air space above said oil, a ported piston in said cylinder having a rod which extends through said diaphragm into said hood, a lever having a pivot pin at one end which is mounted in said hood, an arm in said hood rigidly connected at one end to said pivot pin and connected at its other end to said piston rod, so as to raise and lower the same, and a rod connecting the opposite end of said lever and said spring.

3. In a shock absorber of the character described, the combination with the side bar of a vehicle, the axle and a spring connected to said side bar and to said axle, of a housing comprising a hood which is bolted to said side bar, a lower member comprising a cylinder and a communicating chamber, and a diaphragm which separates said hood and lower member, said cylinder and communicating chamber being partially filled with oil; a packing box in said diaphragm, a ported piston in said cylinder submerged in said oil, a rod connected to said piston and extending through said packing box into said hood; a pin in the upper end of said piston rod, an arm having bifurcated members at one end for engaging said pin, a lever having a pin at one end which is mounted in said hood and rigidly attached to the other end of the bifurcated arm, and a rod having a resilient connection with the free end of said lever and with said spring.

4. In a shock absorber of the character described, the combination with a vehicle side bar and the spring secured thereto, a cylinder bolted to said side bar and adapted to be partially filled with oil, a piston in said cylinder, and a lever mechanism mounted on the cylinder, of a rod, the end portions of which are formed into coils which terminate in short, straight portions at right angles to the rod, and means for rigidly securing said right angled portions respectively to said lever mechanism and to said spring.

5. In a shock absorber of the character described, the combination with a vehicle side bar and the spring secured to said side bar, a receptacle bolted to said side bar comprising a cylinder and a communicating chamber, which are adapted to be partially filled with oil, a piston in said cylinder, and reciprocating means connected with said piston including a lever; of a rod, the end portions of which are formed into coils which terminate in short portions at right angles to said rod, and means for rigidly securing said right angled portions respectively to the free end of said lever and to said spring.

6. In a shock absorber of the character described, the combination with a vehicle side bar, the spring connected therewith, and a shock-absorbing mechanism secured to said side bar and including a lever; of means for connecting the free end of said lever and said spring, comprising a resilient rod, the end portions of which are bent into one or more coils which terminate in short, straight portions at right angles to said rod, and means for rigidly connecting said right angled portions respectively to the free end of said lever and to said spring.

7. In a shock absorber of the character described, the combination with a vehicle side bar, the axle, and a spring connected to said side bar secured to said axle; of a housing comprising a hood which is bolted to said side bar, a lower member comprising a cylinder and a communicating chamber, which are adapted to be partially filled with oil, and a separating diaphragm bolted between said hood and lower member, a lever having a rigid pin which is mounted in said hood, an arm in said hood, one end of which is rigidly secured to said pin, its opposite end being divided to form two bifurcated members, a piston rod extending through said diaphragm into said cylinder, and having a ported piston on its lower end which is submerged in the oil in said cylinder; a pin extending through the upper end of said piston rod and projecting from each side of the same, a rectangular block pivotally mounted on each extended portion of said pin, and fitting slidably in the bifurcated members of said arm, vertical slideways in the walls of said hood and blocks pivotally mounted on the ends of said pin and lying on said slideways, and a resilient rod, the ends of which have right angle bends, which are rigidly connected respectively to the free end of said lever and said spring.

8. A shock absorber of the character described, consisting of a receptacle comprising a cylinder and a chamber adapted to be partially filled with oil, a communicating opening being formed in the lower end of the wall separating the chamber and cylinder, a cap for said receptacle and a hood bolted to said cap and said receptacle, a piston rod extending through said cap into said cylinder and provided on its lower end with a perforated piston, a pin in the upper end of the piston rod and slideways in the sides of said hood to receive the ends of said pin, an arm, one end of which is divided to straddle said pin, the two members of the divided end being each bifurcated to straddle said pin, a lever having an integral pin which is mounted in the outer wall of said hood, the inner end of said pin being rigidly attached to the free end of said arm, an arm resiliently connected at one end to the free end of said lever, said hood being adapted to be bolted to a vehicle side bar, and the other end of said rod being adapted to be secured to a spring which is attached to said side bar.

9. In a shock absorber of the character described, the combination with a vehicle side bar and the spring attached to said side bar; of a cylinder bolted to said side bar and having a communicating chamber, said cylinder and chamber being partially filled with oil, a piston in said cylinder submerged in said oil and provided with holes extending through the same, a lever mechanism connected to said piston to reciprocate the same, and a rod resiliently connected at its ends to said lever mechanism and to said spring, whereby as the piston travels up through the oil, a portion of the oil is raised by the piston, thereby reducing the area of the air space above said piston, and simultaneously compressing the air in said space above the piston, the down stroke of said piston raising the oil lever in said chamber, thereby reducing the air space therein, and simultaneously compressing the air in said space, thus absorbing the shock due to the drop and rebound of the vehicle body.

10. In a shock absorber of the character described, the combination with a vehicle side bar, the spring connected therewith, and a shock absorbing mechanism secured to said bar and including a lever; of a resilient rod, the end portions of which are formed into one or more coils, which terminate in short, straight portions at right angles to the rod, one of which is bolted to the free end of said lever, a clip secured to said spring having bent up portions provided with holes for the reception of the other right angled member of the rod, and means for securing said member to said clip.

In testimony whereof I affix my signature in presence of two witnesses.

FRANK N. SPRAGUE.

Witnesses:
G. SARGENT ELLIOTT,
ELIZABETH SMITH.